(12) United States Patent
Kitabatake

(10) Patent No.: US 6,369,133 B2
(45) Date of Patent: Apr. 9, 2002

(54) POLYESTER-BASED AQUEOUS COATING COMPOSITION

(75) Inventor: Michiharu Kitabatake, Ota-ku (JP)

(73) Assignee: Kansai Paint Co., Ltd., Hiratsuka (JP)

( * ) Notice: Subject to any disclaimer, the term of this patent is extended or adjusted under 35 U.S.C. 154(b) by 0 days.

(21) Appl. No.: 09/798,118

(22) Filed: Mar. 2, 2001

(30) Foreign Application Priority Data

Mar. 2, 2000 (JP) ........................................ 2000-057141
Mar. 2, 2000 (JP) ........................................ 2000-057145

(51) Int. Cl.$^7$ ............................. C08K 3/20; C08L 63/04
(52) U.S. Cl. ..................... 523/410; 523/414; 525/165; 528/93; 528/94
(58) Field of Search ................................ 513/410, 414; 525/165; 528/93, 94

(56) References Cited

U.S. PATENT DOCUMENTS 4,312,795 A * 1/1982 Taguchi .................... 260/18 R

FOREIGN PATENT DOCUMENTS

| JP | 5740525 | 3/1982 |
| JP | 6137811 | 2/1986 |
| JP | 4359075 | 12/1992 |

* cited by examiner

Primary Examiner—Margaret G. Moore
Assistant Examiner—D. Aylward
(74) Attorney, Agent, or Firm—Huntley & Associates

(57) ABSTRACT

Polyester-based aqueous coating compositions comprising a mixture of a carboxyl-functional polyester resin (A), a water-insoluble epoxy resin (B), and a hydrophobic solvent (C), the mixture being neutralized with neutralizer (D) and dispersed or dissolved in water. The compositions have excellent film forming and processing characteristics, and are particularly useful in coating the interior surface of cans and as automobile coatings.

8 Claims, No Drawings

POLYESTER-BASED AQUEOUS COATING COMPOSITION

BACKGROUND OF THE INVENTION

1. Field of the Invention

This invention relates to crosslinkable aqueous coating compositions which exhibit excellent film-forming and curing characteristics, in terms of processability and safety. The compositions can be used for coating the interior surfaces of cans. Moreover, these crosslinkable aqueous coating compositions are capable of forming films having excellent hardness, and accordingly can be used as primers or finish coats for automotive or industrial applications.

2. Description of the Prior Art

In the past, aqueous coating compositions have been made from the reaction product of a high acid value acrylic resin and a high molecular weight bisphenol A based epoxy resin. These compositions have been used for coating the interior surface of cans. However, recently questions have been raised about bisphenol A, and effort has been directed to coating compositions in which bisphenol A does not elute.

Polyester resins have previously been proposed for use as a base resin in aqueous coatings. Japanese Laid-Open Patent Application No. 61-37811 discloses a thermosetting resin composition prepared by emulsifying a water-soluble polyester resin and an epoxy resin. The composition contains hydrophilic solvent for polyester resin, and exhibits increased dispersion power. However, the film forming ability and processability for coating the interior surface of cans is inadequate. In addition, attempts to improve processability often result in reduction of the stability of an emulsion of this type.

Compositions for coating substrates other than cans have been prepared from polyester resin obtained by using hydrophilic materials such as those having sulfonic acid metal salt, polyalkylene glycol, aliphatic dicarboxylic acid and the like. These compositions exhibit good solubility and dispersibility in water. However, the water resistance of the resulting coating was not satisfactory. Japanese Laid-Open Patent Application No. 57-40525 and No. 61-37811 disclose a technique to raise water dispersion capacity in which a hydrophilic solvent is used in the polyester resin having a content of hydrophilic material reduced. However, the hardness and physical properties of the resulting coating were inadequate.

Aqueous coating compositions have also been proposed containing a polyester resin having hydroxyl group and carboxyl group, an alicyclic epoxy resin and a quaternary ammonium compound. These are described in Japanese Laid-Open Patent Application No. 4-359075. These compositions provided good storage stability and film properties. Continuing effort has been directed toward further improvement of stain resistance and scratch resistance in the final finish. In addition, it has been difficult to provide a good balance between a high hardness in the coatings made using the polyester resin and emulsion stability after dispersion in water.

SUMMARY OF THE INVENTION

The present invention is provides polyester-based aqueous coating compositions which exhibit good emulsion stability after dispersing in water, excellent processability, film forming ability, and cost performance when used in coating the interior surface of cans.

The invention also provides polyester-based aqueous coating compositions which exhibit good emulsion stability after dispersing in water, excellent curability, film forming ability and film hardness when used as either an undercoating or finish coating on automobile bodies or industrial products.

Specifically, the present invention provides a polyester-based aqueous coating composition comprising a mixture of carboxyl-functional polyester resin (A) which is a condensation product of at least one polyalcohol of which ethylene glycol comprises at least about 60 mol % based on the total polyalcohol component and at least one polybasic acid of which polyvalent aromatic carboxylic acid comprises at least about 80 mol % based on the total polybasic acid component, and which has a number average molecular weight of about from 1,000 to 20,000 and an acid value of about from 10 to 170 mgKOH/g;

DETAILED DESCRIPTION OF THE INVENTION

The carboxyl-functional polyester resin (A) used in the present invention is a condensation product of a polyalcohol component comprising at least about 60 mol ethylene glycol, based on the total polyalcohol components, and a polybasic acid component comprising at least about 80 mol %, based on the total polybasic acid components, of a polyvalent aromatic carboxylic acid, and contains carboxyl groups in the resin. The polyester resin has a number average molecular weight of about from 1,000 to 20,000 and an acid value of about form 10 to 170 mgKOH/g.

The polyester resin can be prepared by any of the following methods (1), (2), or (3). Method (1) involves esterifying polybasic acid components and polyalcohol components using an excess of the former over the latter. Method (2) involves reacting an acid anhydride with a polyester polyol which is obtained by reaction of polybasic acid components and polyalcohol components with a molar excess of the polyalcohol components. Method (3) involves a first step of preparing a hydroxyl-functional polyester by alcoholysis of a high molecular weight polyester such as polyethylene terephthalate or polybutylene terephthalate; then esterifying the resulting hydroxyl-functional polyester with polybasic acid components, and if necessary, polyalcohol components, under conditions in which the polybasic acid components are in molar over the hydroxyl-functional components.

Examples of polybasic acids which can be used in the present invention, mainly in the preparation of the polyester resin, include dicarboxylic acids such as phthalic acid, phthalic anhydride, isophthalic acid, terephthalic acid, tetrahydrophthalic acid, tetrahydrophthalic anhydride, hexahydrophthalic acid, hexahydrophthalic anhydride, hexahydroisophthalic acid, hexahydroterephthalic acid, 4-carbonylhexahydrophthalic acid, 4-carbonylhexahydrophthalic anhydride, 3-carbonyltetrahydrophthalic acid, 3-carbonyltetrahydrophthalic anhydride, succinic acid, succinic anhydride, fumaric acid, adipic acid, azelaic acid, sebacic acid, maleic acid, maleic anhydride and lower alkyl esters of these dicarboxylic acids. In addition to these dicarboxylic acids, monobasic acids such as benzoic acid, crotonic acid, p-t-butyl benzoic acid and other various fatty acids can be used. Further, trivalent or higher polycarboxylic acids such as trimellitic acid, trimellitic anhydride, methylcyclohexene tri-carboxylic acid, pyromellitic acid, pyromellitic anhydride and butane tricarboxylic acid can also be used. Among these polybasic acids, it is important that the polyvalent aromatic carboxylic acid comprise at least about 80 mol %, preferably more than 90 mol %, based on the total polybasic acid components. This high concentration of the polyvalent aromatic carboxylic acid has been found to contribute good hydrolysis stability resistance.

Examples of the polyalcohols which can be used in the present invention, mainly in the preparation of the polyester resin, include dihydric alcohols including aliphatic glycols such as ethylene glycol, diethylene glycol, triethylene glycol, propylene glycol, 1,2 butanediol, 1,3-butanediol, 1,4-butanediol, neopentyl glycol, 2-methylpropane diol, 3-methylpentane diol, 1,4-hexane diol, 1,6-hexane diol, 1,5-pentane diol, 1, 9-nonane diol, diethyl pentane diol, and 2-butyl ethyl propanediol; alicyclic glycols such as cyclohexane dimethanol and spiro glycol; aromatic glycols such as ethylene oxide or propylene oxide addition product of bisphenol compound; polyether polyol such as polyethylene glycol, polypropylene glycol, polybutylene glycol; polyurethane polyol obtained by the reaction of glycol and polyisocyanate compound. In addition to these dihydric alcohols, trivalent or higher polyhydric alcohol such as glycerin, trimethylolethane, trimethylolpropane, pentaerythritol and the like can be used. These polyalcohols can be used singly or as a mixture of two or more. Further, a glycol including ester functionality in the molecular structure such as bishydroxyethyl terephthalate can be used. Among these polyalcohols, ethylene glycol should comprise at least about 60 mol %, preferably more than about 70 mol %, based on the total polyalcohol components. This high concentration of ethylene glycol provides good film hardness and, in the coating to cans, flavor-retaining ability. Further, it is preferred that butylene glycol be used in combination with ethylene glycol. This combination results in excellent physical properties in the resulting film, such as processability. It is assumed that molar quantity of glycol including ester function in molecular adds with mole ratio of minimum unit monomer. In a bishydroxyethyl terephthalate, for example, it calculates as terephthalic acid 1 mol and ethylene glycol 2 mol.

The condensation or transesterification of both above-mentioned components can be performed by known methods to form the polyester resin (A).

In the first method, the polyester resin (A) can be obtained by means of direct condensation or transesterification of the polybasic acid component and the polyalcohol component, with the polybasic acid being in molar excess over the polyalcohol. In that case, to provide the best processability, it is preferable that the amount of trivalent or higher component based on a total of the polybasic acid component and the polyalcohol component be less than about 12 mol %, preferably less than 7 mol %.

In the second method for preparing polyester resin (A), the polyester polyol can be prepared by means of the direct condensation or transesterification of the polybasic acid component and the polyalcohol component on the condition that the polyalcohol is in moar excess of the acid. In the case of the preparation of the polyester polyol, to provide the best processability, it is preferable that the amount of the trivalent or higher component based on the total of the polybasic acid component and the polyalcohol component be less than about 12 mol %, preferably less than 7 mol %. The polyester resin (A) can be obtained by the reaction of an acid anhydride to the polyester polyol. Examples of acid anhydrides which can be used include phthalic anhydride, succinic anhydride, maleic anhydride, hexahydro phthalic anhydride, and trimellitic anhydride.

In the third method, polyester resin (A), the polyester resin (A) can be obtained by first preparing a hydroxyl-functional polyester by alcoholysis of a high molecular weight polyester as a starting material and a second step of directly esterifiying or transesterifying the hydroxyl-functional polyester thus obtained, polybasic acid component and, if necessary, the polyalcohol component, provided that the polybasic acid component is in molar excess over the hydroxyl-functional components. In this case, to provide the best processability, it is preferable that the amount of the trivalent or higher component based on the total of the polybasic acid component and the polyalcohol component be less than about 12 mol %, preferably less than 7 mol %.

In the methods (1), (2), and (3) above, the reaction of the direct condensation or transesterification can be promoted by operating under pressure or reduced pressure, or flowing inert gas. Further, an organometallic catalyst such as di-n-butyl tin oxide can be used as a condensation catalyst. Of these three methods, method (1) is preferred on the basis of ease of control of molecular weight and acid value.

The carboxyl-functional polyester resin (A) has a number average molecular weight of about from 1,000 to 20,000, preferably about from 2,000 to 10,000, and an acid value of about from 10 to 170 mg KOH/g, preferably about from 25 to 75 mg KOH/g. These characteristics provide good processability, flavor-retaining ability, curability and stability. The ratio of the acid and alcohol components, and the specific kind of each component can be adjusted, according to factors known in the art, so that a polyester resin having above property values is provided. In addition, for good dispersibility and curability, the carboxyl-functional polyester resin (A) should have a hydroxyl value of about 10 mg KOH/g or less, preferably 5 mg KOH/g or less, and have a glass transition temperature of about 0° C. or more, and preferably about from 20 to 80° C.

The water-insoluble epoxy resin (B) is used as a curing agent and has at least two epoxy groups in a molecule. Examples of the epoxy resin which can be used include glycidyl ether compounds such as 2-glycidylphenyl glycidyl ether, 2,6-diglycidyphenyl ether; glycidyl ester of aliphatic alcohol and alicyclic alcohol; bisphenol based epoxy resin which is prepared by reaction of epichlorohydrin with bisphenol compound such as bisphenol F, bisphenol A, and 1,1-bis (4hydroxyphenyl) ethane; Novolac based epoxy resin such as phenol Novolac type epoxy resin, creosol Novolac type epoxy resin; epoxidized polybutadiene; alicyclic epoxy-functional resin such as alicyclic epoxyfunctional compound (e.g., 3, 4-epoxycyclohexylmethyl-3,4-epoxycyclohexane carboxylate), alicyclic epoxy-functional copolymer which is obtained by copolymerizing a polymerizable unsaturated monomer having an alicyclic epoxy-group (e.g., 3,4-epoxy cyclohexyl (meta)acrylate) with other polymerizable unsaturated monomers; glycidylfunctional acrylic resin which is obtained to use a polymerizable unsaturated monomer having a glycidyl group (e.g., glycidyl (meta)acrylate, glycidyl allyl ether). It is preferable that an epoxy resin which does not include free bisphenol A be used for coating the interior surface of cans. Further, the Novolac based epoxy resin is preferred from point of food hygiene and film properties. When free bisphenol A is completely removed by purification, even in coating the interior surface of cans, the bisphenol A type epoxy resin prepared by the reaction with bisphenol A and epichlorohydrin can be employed. On the other hand, the alicyclic epoxy-functional resin or the glycidyl-functional acrylic resin is preferred for use in finish coatings.

The epoxy resin (B) can be compounded in the manner that an equivalent ratio of the carboxyl group of the polyester resin (A) and the epoxy group of the epoxy resin (B) is in the range of about from 1/0.3 to 1/1.5, preferably about from 1/0.5 to 1/1.0.

The hydrophobic solvent (C) works as a viscosity controller in mixing and dispersing, an inhibitor of crystallization of resin, and a film forming auxiliary for use in formation of continuous film. Examples of the hydrophobic solvent (C) which can be used include aromatic hydrocarbons such as toluene, and xylene; ketones such as butanone, and methyl isobutyl ketone; cyclic ketones such as cyclohexanone, and isophorone; alcohol ethers such as ethylene glycol monohexyl ether, ethylene glycol monophenyl ether, and propylene glycol phenyl ether; alcohols such as 2-ethylhexyl ethyl alcohol, butyl alcohol, hexyl alcohol, and benzyl alcohol; petroleum solvents such as "Swasol 1500" (product of Cosmo Oil Co., Ltd.), "Solvesso 150" (product of Etsuso Sekiyu KK); "Texanol" (ester alcohol, product of Eastman Chemical Japan Ltd.), "Kyowanol M" (product of Kyowa Hakko Kogyo Co., Ltd.).

These solvents can be used alone, or as a mixture of two or more thereof. Of these, Cyclohexanone is particularly preferred.

The amount of hydrophobic solvent (C) should be present in quantities of about from 1 to 200 parts by weight per 100 parts by weight of the total resin solid. If the amount is less than 1 part by weight, it results in poor film forming ability and smoothness of coating film, while amounts higher than 200 parts by weight causes instability on emulsifying. When the hydrophobic solvent (C) is used in quantities higher than this range, for example, to facilitate te preparation of a mixture before water dispersion, it can be adjusted to the range indicated above by conventional methods such as azeotropy or reduced pressure in the emulsion after water dispersion.

A water miscible organic solvent can be admixed with the hydrophobic solvent (C) before water dispersion, if necessary. Water miscible organic solvents which can be used include, for example, butyl cellosolve, monomethyl carbitol, dimethyl carbitol, monoethyl carbitol, propylene glycol monomethyl ether, acetone, methanol, ethanol, and isopropanol. It is desirable that the amount of water miscible organic solvent is less than about 40% by weight, preferably 20% by weight, based on the total solvent content.

In the present invention, the mixture of the carboxyl-functional polyester resin (A), the water-insoluble epoxy resin (B) and the hydrophobic solvent (C) is neutralized with neutralizer (D) and dispersed into water.

A basic compound such as an amine or ammonia can be used for neutralizer (D).

Examples of the amines which can be used include alkylamines such as trimethylamine, triethylamine, and tributyl amine; alkanolamines such as dimethylethanolamine, methyldiethanolamine, diethanolamine, and aminomethyl propanol; cyclic amines such as morpholine, alkyl morpholine, methylpiperazine, and ethyl piperazine. The triethylamine and dimethylethanolamine are preferred among these. The neutralization degree is generally in the range of about from 0. 2 to 1—0 equivalent, preferably about from 0.1 to 2. 0 equivalent, per one equivalent of the carboxyl group in the resin (A).

The mixture including carboxyl-functional polyester resin (A) is neutralized and dispersed into water by ordinary techniques. For example, the mixture including the carboxyl-functional polyester resin (A) can be doped by degrees, with agitating, in aqueous medium containing the neutralizer (D). In another method, the mixture including the carboxyl-functional polyester resin (A) is neutralized with basic compound, and, while agitating, the resulting neutralized mixture can be poured into water, or water can be poured into the neutralized mixture. Further, the solvent content in coating can be adjusted by removing solvent with water under reduced pressure.

The aqueous coating compositions of the present invention can optionally include curing catalysts, antifoaming agents, lubricants, reforming resins, pigments, flocculation inhibitors, leveling agents, rheology control agents, odorants, and cissing inhibitors or anti-cratering agents. The solvents above mentioned can be combined as a surfactant after water dispersion.

The curing catalyst promotes the reaction with the carboxyl-functional polyester resin (A) and the water-insoluble epoxy resin (B). The curing catalysts include, for example, water-soluble quaternary ammonium salts such as choline chloride; nicotinamide, organic metal carboxylate, imidazole compound, and metal chelate compound. The amount of the curing catalyst used is generally in the range of about from 0.05 to 3 parts by weight per 100 parts by weight of the total solid of the resin (A) and resin (B).

The aqueous coating compositions of the present invention can be applied to a variety of substrates.

Examples of the substrates include treated or nontreated metal plates such as aluminum plate, steel plate, and tin plate; plates obtained so that a primer such as epoxy-type or vinyl-type is applied to these metal plates; polyethylene terephthalate (PET) sheet; cans or bottles processed by using these metal plates and PET; and those bearing a primer to facilitate electrodeposition. Known coating techniques can be used, such as roll coating, spray coating, dip coating, and electrodeposition coating.

The present invention is explained more fully in the following Examples and Comparative Examples, in which parts and percentages are all by weight.

Preparation of Carboxyl-functional Polyester Resin

Preparation Example 1

A stainless flask equipped with a stirrer, heater, thermometer, nitrogen gas inlet tube, fractionating unit and distillant storage was charged with 8.3 parts of terephthalic acid, 91.3 parts of isophthalic acid, 9.7 parts of trimellitic anhydride, 88.9 parts of bishydroxyethyl terephthalate, 26 parts of neopentyl glycol, and 0.1 part of dibutyl tin dioxide per 100 parts of total of above materials as catalyst. The mixture was heated to 240° C. with agitation under nitrogen. After the temperature was raised to 240° C. while distilling off condensed water, the temperature was kept at 240° C. and the reaction was allowed to proceed. When distillation water stopped at one or two hours, xylene was added due to promote the reaction. The polycondensation reaction was continued until an acid value of 45 was attained. The carboxyl-functional polyester resin (A-1) thus obtained had a number average molecular weight of 3,000.

Preparation Examples 2 to 8

The carboxyl-functional polyester resins (A-2) to (A-8) were prepared in the same manner as in Preparation Example 1, except that the formulation of polyester materials was charged as shown in Table 1. Table 1 also shows acid value and number average molecular weight of each polyester resin (A-2) to (A-8).

TABLE 1

|  | Preparation Example | | | | |
| --- | --- | --- | --- | --- | --- |
|  | 1 | 2 | 3 | 4 | 5 |
| Polyester resin | A-1 | A-2 | A-3 | A-4 | A-5 |
| Terephthalic Acid | 8.3 |  |  | 16.6 | 16.6 |
| Isophthalic acid | 91.3 | 49.8 | 99.6 | 74.7 | 41.5 |
| Adipic acid |  | 29.2 |  | 29.2 | 43.8 |
| Trimellitic anhydride | 9.7 | 19.4 | 19.4 | 9.7 | 9.7 |
| Benzoic acid |  |  | 6.1 |  |  |
| Bishydroxyethyl terephthalate | 88.9 | 101.6 | 76.2 | 50.8 | 76.2 |
| Ethylene glycol |  |  | 24.2 |  | 6.0 |
| Neopentyl glycol | 26 |  |  | 58.2 | 26 |
| 1,4-butandiol |  | 13.5 |  |  |  |
| Acid value | 45 | 65 | 50 | 40 | 45 |
| Number average molecular weight | 3000 | 2000 | 2500 | 3500 | 3000 |

TABLE 1-continued

|  | Preparation Example | | |
|---|---|---|---|
|  | 6 | 7 | 8 |
| Polyester resin | A-6 | A-7 | A-8 |
| Terephthalic acid |  | 8.3 |  |
| Isophthalic acid | 66.4 | 91.3 | 58.1 |
| Adipic acid | 14.6 |  | 87.6 |
| Trimellitic anhydride | 19.4 | 9.7 | 9.7 |
| Benzoic acid |  |  |  |
| Bishydroxyethyl terephthalate | 101.6 | 88.9 |  |
| Ethylene glycol |  |  | 43.4 |
| Neopentyl glycol |  | 27 | 26 |
| 1,4-butandiol | 13.5 |  |  |
| Acid value | 65 | 56 | 45 |
| Number average molecular weight | 2500 | 2500 | 3000 |

Production of Aqueous Coating Composition

Example 1

A reaction vessel was charged with the polyester resin (A-1) obtained in Preparation Example 1 and cooled until 1 50° C. 50 parts of cyclohexanone per 100 parts of the resin was added and the mixture was cooled to 100° C. When the temperature was 100° C., 10 parts of "ECN1299" (manufactured by Asahi Kasei Epoxy Co., Ltd., creosol Novolac phenol epoxy resin) as a curing agent was added and the mixture was dissolved in uniformity. Subsequently, 5 parts of dimethylethanolamine was added, and the mixture was neutralized and diluted with 275 parts of deionized water to obtain a transparent or opaque white water dispersion having a solid content of 25 %. The water dispersion had good emulsion appearance without precipitating after the storage at 20° C. for one month.

The resulting water dispersion was mixed with 0.25 parts of choline chloride as a curing catalyst and 10 parts of isopropanol a surfactant, followed by stirring to obtain an aqueous coating composition.

Examples 2 to 4 and Comparative Examples 1 to 4

The general procedure of Example 1 was repeated, except that the compositions shown in Table 2 were used, to obtain aqueous coating compositions having a solids content of 25%. But, in the composition of Comparative Example 2, water dispersion could not be performed, and therefore the aqueous coating composition was not obtained.

Performance Test

The aqueous coating compositions obtained Examples and Comparative Examples were applied to aluminum sheets with a bar coater to form coating films having a thickness of 15 μm (when dried), followed by baking at 230° C. for 10 minutes. Each coating film was subjected to the following performance tests; The results are summarized in Table 3.
(*1) Film surface condition: The surface of the film was visually evaluated according to the following criteria.
A: Excellent smoothness with no foaming over the entire film
B: Slight unevenness with small foam all over the film
C: Slight unevenness with large foam all over the film
(*2) Gel fraction ratio: The aqueous coating composition was applied to a weight of W1 of tin plate to obtain a coated plate having a weight of W2. A flask equipped with reflux condenser is charged with the coated plate having a weight of W2 and methyl ethyl ketone so that the coating area to the amount of methyl ethyl ketone may be 100 cm2 to 100 cc, followed by heating to reflux for 1 hour. Thereafter the coated plate was picked up and dried at 120° C. for 30 minutes. The coated plate was cooled down until room temperature and a weight of W3 of the coated plate was measured. The gel fraction ratio (%) was pursued by means of the following formula.

Gel fraction ratio (%)={(W3−W1)/(W2−W1)}*100

(*3) Processability: A coated plate was folded into two equal parts in such a way that the film was outside. A 1-kg iron load was dropped on the bent portion of the coated plate from a height of 50 cm. A length of crack of the bent portion of the coated plate was measured and evaluated according to the following criteria.
A: Less than 5 mm
B: 5 mm or more and less than 20 mm
C: 20 mm or more
(*4) Water resistance: A coated plate was treated at 125° C. for 35 minutes in an autoclave followed by dipping into water to evaluate visually a degree of blushing of the film according to the following criteria.
A: No blushing
B: Slight degree of blushing
C: Remarkable degree of blushing
(*5) Adhesion: Squares were formed by effecting 11 cuts respectively in length and width at about 1.5 mm intervals on a film of a test plate by using a knife. An adhesive cellophane tape having a width of 24 mm was adhered to the squares, followed by strongly peeling the tape to evaluate the adhesion properties of the squares according to the following criteria.
A: No peeling
B: Slight degree of peeling
C: Remarkable degree of peeling
(*6) Adhesion after water resistance test: A coated plate was treated at 125 V for 35 minutes in an autoclave followed by dipping into water. Squares were formed by effecting 11 cuts respectively in length and width at about 1.5 mm intervals on the film of the coated plate by using a knife. An adhesive cellophane tape having a width of 24 mm was adhered to the squares, followed by strongly peeling the tape to evaluate the adhesion properties of the squares according to the above (*5) criteria.
(*7) Corrosion resistance: The aqueous coating compositions obtained Examples and Comparative Examples were applied to the inside surface of steel two-piece cans having capacity of 250 cc by a hot air spray coating to form coating films 15 μm (when dried), followed by baking at 215° C. for 60 seconds to obtain the coated two-piece can bodies. 10 % pineapple juice was heated at 98° C. and packed into the coated two-piece can, followed by hermetically sealing the can. After storage at 37° C. for 6 months, the can was opened and the degree of corrosion of the inside of, the can was visually evaluated according to the following criteria.
A: No change
B: Slight corrosion
C: Remarkable corrosion
(*8) Flavor-retaining ability: Tap water (250 cc) treated with activated carbon was packed into the coated two-piece can obtained similarly as above (*7). The can was hermetically sealed and treated for sterilization at 100° C. for 30 minutes. After storage at 37° C. for 6 months, the liquid in the can was tested for flavor-retaining ability and evaluated according to the following criteria.

A: No change in flavor
B: Slight change in flavor
C: Remarkable change in flavor

TABLE 2

|  | Example | | | | Comparative Example | | | |
| --- | --- | --- | --- | --- | --- | --- | --- | --- |
|  | 1 | 2 | 3 | 4 | 1 | 2 | 3 | 4 |
| Polyester resin kind | A-1 | A-2 | A-1 | A-3 | A-1 | A-1 | A-4 | A-5 |
| Amount | 100 | 100 | 100 | 100 | 100 | 100 | 100 | 100 |
| Cyclohexanone | 50 | 50 | 30 | 50 |  | 50 | 50 |  |
| Solvesso 1500 |  |  | 20 |  |  |  |  |  |
| Butylcellosolve |  |  |  |  | 50 |  |  |  |
| Propylene glycol monomethyl ether |  |  |  |  |  | 50 |  |  |
| Novolac epoxy resin | 10 | 10 | 10 | 10 | 10 | 10 | 10 | 10 |
| Dimethylethanol-amine | 5.0 | 7.2 | 5.0 | 5.5 | 5.0 | 5.0 | 4.4 | 5.0 |
| Neutralization equivalent | 0.7 | 0.7 | 0.7 | 0.7 | 0.7 | 0.7 | 0.7 | 0.7 |
| Deionized water | 275 | 273 | 275 | 275 | 275 | 275 | 276 | 275 |
| Total amount | 440 | 440 | 440 | 440 | 440 | 440 | 440 | 440 |
| Emulsion appearance | Good | Good | Good | Good | Good | — | Good | Good |
| Storage stability (40° C. × 1 month) | Good | Good | Good | Good | * | — | Good | Good |

*Sedimentation/ separation

TABLE 3

|  | Example | | | | Comparative Example | | |
| --- | --- | --- | --- | --- | --- | --- | --- |
|  | 1 | 2 | 3 | 4 | 1 | 3 | 4 |
| Film surface condition | ○ | ○ | ○ | ○ | ○ | ○ | ○ |
| Gel fraction ratio | 85 | 87 | 84 | 86 | 83 | 84 | 83 |
| Processability | ○ | ○ | ○ | ○ | ○ | X | ○ |
| Water resistance | ○ | ○ | ○ | ○ | ○ | ○ | ▲ |
| Adhesion | ○ | ○ | ○ | ○ | ○ | ○ | ○ |
| Adhesion after water resistance test | ○ | ○ | ○ | ○ | ○ | ○ | ▲ |
| Corrosion resistance | ○ | ○ | ○ | ○ | ○ | ○ | ○ |
| Flavor-retaining ability | ○ | ○ | ○ | ○ | ○ | ○ | X |

Production of Aqueous Coating Composition

Example 5

The flask was charged with the polyester resin (A-1) obtained in Preparation Example 1 and cooled until 150° C. 50 parts of cyclohexanone per 100 parts of the resin was added and the mixture was cooled until 100° C. When the temperature was 100° C., 10 parts of "EHPE-3150, (manufactured by Daicel Chemical Industries, Ltd., alicyclic epoxy resin) as a curing agent was added and the mixture was dissolved in uniformity. Subsequently, 5 parts of dimethylethanolamine was added, and the mixture was neutralized and diluted with 275 parts of deionized water to obtain a transparent or opaque white water dispersion having a solid content of 25 %. The water dispersion had good emulsion appearance without precipitating after the storage at 40° C. for one month.

The resulting water dispersion was mixed with 1 part of choline chloride as a curing catalyst and 10 parts of isopropanol a surfactant, followed by stirring to obtain an aqueous coating composition.

Example 6, 7 and Comparative Example 5 to 8

The general procedure of Example 5 was repeated, except that the compositions shown in Table 4 were used, to obtain aqueous coating compositions having a solid content of 25%. But, in each composition of Comparative Example 6 and 7, water dispersion could not be performed, and therefore the aqueous coating composition was not obtained.

Performance Test

The aqueous coating compositions obtained Example 5 to 7 and Comparative Example 5 to 8 were applied to tin plates with a bar coater to form coating films 10 μm (when dried), followed by baking at 230° C. for 10 minutes. Each coating film was subjected to the following performance tests. The result is summarized in Table 5.

(*1) Film surface condition: The surface of the film was visually evaluated according to the following criteria.
  A: Excellent smoothness with no foaming over the entire film
  B: Slight unevenness with small foam all over the film
  C: Slight unevenness with large foam all over the film (*2) Adhesion: Squares were formed by effecting 11 cuts respectively in length and width at about 1 mm intervals on a film of a coated plate by using a knife according to JIS K-5400. An adhesive cellophane tape was adhered to the squares, followed by strongly peeling the tape to measure a number of remaining squares per 100 squares.

(*3) Pencil hardness: A pencil hardness of the coated plate was measured by pencil scratch examination of JISK-5400.

(*4) Bending resistance: A coated plate was placed at 20° C. atmosphere and bent in a right angle in two or three seconds in such away that the film was outside. A peeling condition of the bent portion of the coated plate was evaluated according to the following criteria.
  A: No change
  B: Peeling and cracking was found

TABLE 4

|  | Example | | | Comparative Example | | | |
| --- | --- | --- | --- | --- | --- | --- | --- |
|  | 5 | 6 | 7 | 5 | 6 | 7 | 8 |
| Polyester resin kind | A-1 | A-6 | A-1 | A-1 | A-1 | A-7 | A-8 |
| Amount | 100 | 100 | 100 | 100 | 100 | 100 | 100 |
| Cyclohexanone | 50 | 50 | 30 |  |  | 50 | 50 |
| Solvesso 1500 |  |  | 20 |  |  |  |  |
| Butylcellosolve |  |  |  | 50 |  |  |  |
| Propylene glycol monomethyl ether |  |  |  |  | 50 |  |  |
| Novolac epoxy resin | 10 | 10 | 10 | 10 | 10 | 10 | 10 |
| Dimethylethanol-amine | 5.0 | 7.2 | 5.0 | 5.0 | 5.0 | 4.4 | 5.0 |
| Neutralization equivalent | 0.7 | 0.7 | 0.7 | 0.7 | 0.7 | 0.7 | 0.7 |
| Deionized water | 275 | 273 | 275 | 275 | 275 | 276 | 275 |
| Total amount | 440 | 440 | 440 | 440 | 440 | 440 | 440 |
| Emulsion appearance | Good | Good | Good | Good | — | — | Good |
| Storage stability (40° C. × 1 month) | Good | Good | Good | * | — | — | Good |

*Sedimentation/separation

TABLE 5

|  | Example | | | Comparative Example | |
| --- | --- | --- | --- | --- | --- |
|  | 5 | 6 | 7 | 5 | 8 |
| Film surface condition | ○ | ○ | ○ | ○ | ○ |
| Adhesion | 100/100 | 100/100 | 100/100 | 100/100 | 100/100 |
| Pencil hardness | 2H | H | 2H | 2H | B |
| Bending resistance | ○ | ○ | ○ | ○ | ○ |

I Claim:

1. A polyester-based aqueous coating composition comprising a mixture of carboxyl-functional polyester resin (A) which is a condensation product of at least one polyalcohol of which ethylene glycol comprises at least about 60 mol % based on the total polyalcohol component and at least one polybasic acid of which polyvalent aromatic carboxylic acid comprises at least about 80 mol % based on the total polybasic acid component, and which has a number average molecular weight of about from 1,000 to 20,000 and an acid value of about from 10 to 170 mgKOH/g; a water-insoluble epoxy resin (B); and hydrophobic solvent (C); the mixture being neutralized with neutralizer (D) and dispersed or dissolved into water.

2. An aqueous coating composition according to claim 1 wherein the carboxyl-functional polyester resin (A) has a hydroxyl value of about 10 mgKOH/g or less.

3. An aqueous coating composition according to claim 1 wherein the water-insoluble epoxy resin (B) consists essentially of Novolac based epoxy resin.

4. An aqueous coating composition according to claim 1 wherein the water-insoluble epoxy resin (B) is selected from alicyclic epoxy-functional resins and glycidyl-functional acrylic resins.

5. An aqueous coating composition according to claim 1 wherein an equivalent ratio of the carboxyl group of the polyester resin (A) and the epoxy group of the epoxy resin (B) is about from 1/0.3 to 1/1.5.

6. An aqueous coating composition according to claim 1 wherein the hydrophobic solvent (C) consists essentially of cyclohexanone.

7. An aqueous coating composition according to claim 1 comprising about from 1 to 200 parts by weight of the hydrophobic solvent (C) per 100 parts by weight of the total resin solids.

8. An aqueous coating composition according to claim 1 comprising about from 0.05 to 3 parts by weight of a curing catalyst per 100 parts by weight of total solids of the polyester resin (A) and the epoxy resin (B).

* * * * *